B. F. STUMP.
LOCK NUT.
APPLICATION FILED MAY 15, 1916.

1,229,808.

Patented June 12, 1917.

Inventor
B. F. Stump

UNITED STATES PATENT OFFICE.

BENJAMAN F. STUMP, OF DUNBAR, NEBRASKA, ASSIGNOR OF ONE-HALF TO H. S. WESTBROOK, OF DUNBAR, NEBRASKA.

LOCK-NUT.

1,229,808. Specification of Letters Patent. Patented June 12, 1917.

Application filed May 15, 1916. Serial No. 97,675.

*To all whom it may concern:*

Be it known that I, BENJAMAN F. STUMP, a citizen of the United States, residing at Dunbar, in the county of Otoe, State of Nebraska, have invented certain new and useful Improvements in Lock-Nuts; and I do hereby declare the following to be a full, clear, and exact description of the invention, such as will enable others skilled in the art to which it appertains to make and use the same.

This invention relates to lock nuts, and aims to provide a simple and improved construction for securely locking a nut upon its bolt, and whereby the locking means may be readily released when it is desired to remove the nut.

A further object of the invention is to provide a device of this character which is of extremely simple and inexpensive construction, which is composed of but few readily assembled parts, all so constructed and assembled as to prevent wear, breakage, or derangement of the same, which is positive in operation, and which will prove thoroughly efficient in the attainment of the ends for which it is designed.

With these objects in view, together with others which will appear as the description proceeds, the invention resides in the novel combination and arrangement of parts, all as will be described more fully hereinafter, illustrated in the drawings and particularly pointed out in the claim.

The invention will be best understood by reference to the accompanying drawings, wherein.

Referring now more particularly to the drawings, 5 indicates a bolt having the usual threads, and 6 is the nut therefor.

Figure 1:
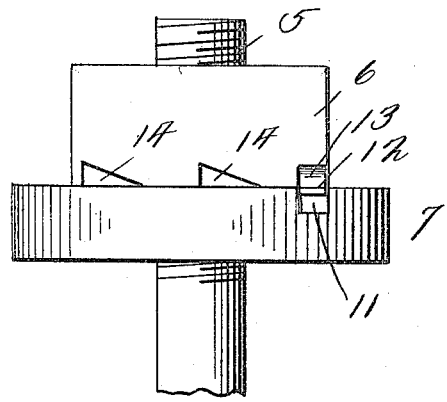
Figure 1, is a side elevation of a lock nut and washer embodying the invention.
Figure 2:
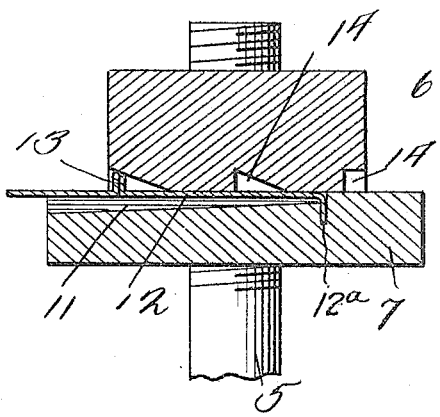
Fig. 2, is a longitudinal sectional view taken through the nut and washer and illustrating the locking lever in operative position.
Figure 3:
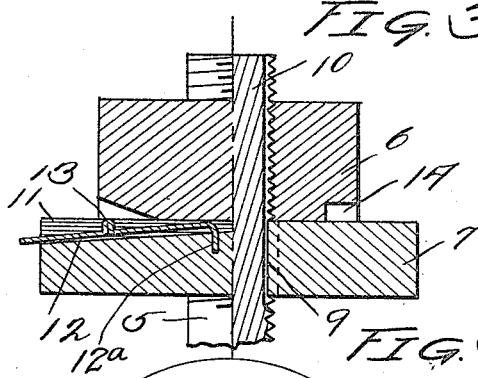
Fig. 3, is a similar view showing the lever retracted.
Figure 5:
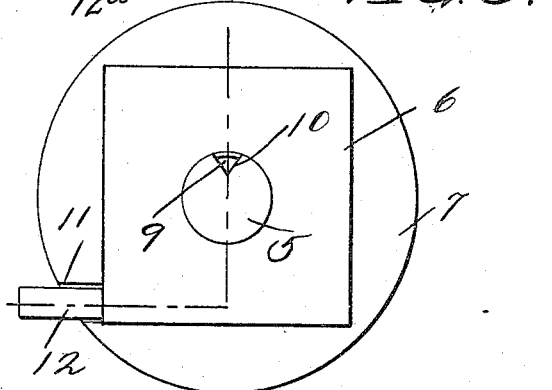
Fig. 5, is a top plan view of the bolt and nut with the improved locking means applied.
Figure 4:
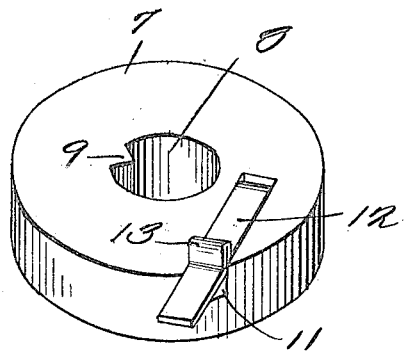
Fig. 4, is a detail perspective view of the washer removed from the bolt.

The locking means for the nut, to be hereafter more fully described, is positioned upon a washer 7, the said washer being provided with a central aperture 8, within which a tooth or key member 9 projects. The bolt 5 is provided on one side with a longitudinally extending channel 10 for the reception of the key or tooth member 9 on the washer. It is thus seen that when the washer is applied to the bolt the same will be held thereon against rotary movement by engagement of the key within the channel. The upper surface of the washer is cut away to provide an elongated groove 11, communicating at one end with the edge of the washer. This groove extends partially across the face of the washer and to one side of the opening 8 therein. A locking lever 12 is embedded at one end in the washer at the innermost end of the groove 11, the said lever being formed of an elongated strip of spring metal adapted when depressed to lie within the groove 11 and below the upper face of the washer 7. The embedded portion of the lever or spring 12 consists of a downturned end 12$^a$ fitted in a suitable slot or recess in the washer and it will be observed by reference to Figs. 2 and 3 that the nut, when in position, prevents this embedded portion from rising out of its recess. The lever projects at its free end beyond the peripheral edge of the washer 7, to enable the said lever to be depressed by the finger. The lever is bent intermediate its ends to provide an upwardly projecting nib or pawl member 13, the said nib projecting above the grooved surface of the washer 7 when the lever is released or in normal position, and lying below the said washer surface when the lever is depressed.

The nut 6 is provided in its under surface with a plurality of spaced radially disposed shoulders 14, the said shoulders forming ratchet teeth to be engaged by the nib 13 on the lever 12. The under surface of the nut is beveled adjacent the approach of each of the ratchet teeth, so that the pawl 13 may freely slip over the teeth when the nut is rotated in one direction, but which will engage the said teeth to hold the nut against rotation in a retrograde direction. The nuts and bolts may be made of various sizes, and the ratchet teeth may be more closely arranged if desired. From this description it is apparent that the nut when bound against the washer 7 will be automatically locked against reverse rotation, and when it is desired to remove the nut from the bolt, the lever 12 may be depressed to withdraw the nib 13 from engagement with the shoulders 14 on the nut base, whereupon the nut may be readily removed from the bolt.

While I have herein shown and described a particular or preferred embodiment of the invention, I wish it to be understood that I need not confine myself to all the precise details of construction herein set forth by way of illustration as modification and variation may be made without departing from the spirit of the invention or exceeding the scope of the claim.

What is claimed is:—

In a device of the kind described, means for locking a nut having ratchet teeth to a washer having a slot in its upper face provided with a recess at its inner end, said means comprising a strip of spring metal doubled intermediate its ends and bent away from the doubled portion to form two alined ends, the terminal portion of one end being bent away from the side from which the doubled portion projects, whereby the strip forms a spring pawl, said strip being of such dimensions as to house within the slot with the bent terminal fitting the recess.

In testimony whereof, I affix my signature, in the presence of two witnesses.

BENJAMAN F. STUMP.

Witnesses:
A. L. BOYD,
WILBER W. ANNESS.

Copies of this patent may be obtained for five cents each, by addressing the "Commissioner of Patents, Washington, D. C."